United States Patent
Connelly et al.

(10) Patent No.: US 9,767,475 B2
(45) Date of Patent: Sep. 19, 2017

(54) REAL TIME AUDIENCE FORECASTING

(75) Inventors: John Patrick Connelly, Santa Cruz, CA (US); Lucian Vlad Lita, Sunnyvale, CA (US); Michael Bigby, Los Gatos, CA (US); Charles Yang, Fremont, CA (US)

(73) Assignee: BLUE KAI, INC., Seattle, WA (US)

( * ) Notice: Subject to any disclaimer, the term of this patent is extended or adjusted under 35 U.S.C. 154(b) by 291 days.

(21) Appl. No.: 12/860,812

(22) Filed: Aug. 20, 2010

(65) Prior Publication Data
US 2012/0047005 A1    Feb. 23, 2012

(51) Int. Cl.
G06Q 30/00    (2012.01)
G06Q 30/02    (2012.01)

(52) U.S. Cl.
CPC ..... *G06Q 30/0241* (2013.01); *G06Q 30/0244* (2013.01); *G06Q 30/0254* (2013.01)

(58) Field of Classification Search
USPC .... 705/14.4, 14.43, 14.49, 14.52, 14.73, 10; 709/224, 226
See application file for complete search history.

(56) References Cited

U.S. PATENT DOCUMENTS

| | | | |
|---|---|---|---|
| 6,950,821 B2 | 9/2005 | Faybishenko et al. | |
| 7,047,206 B1 | 5/2006 | Schultze | |
| 7,418,454 B2 * | 8/2008 | Chen | H04L 67/2804 |
| 7,996,456 B2 | 8/2011 | Gross | |
| 8,200,661 B1 * | 6/2012 | Pearce | G06F 17/30867 |
| | | | 707/721 |
| 2003/0171990 A1 * | 9/2003 | Rao et al. | 705/14 |
| 2005/0114225 A1 | 5/2005 | Longman et al. | |
| 2005/0159996 A1 | 7/2005 | Lazarus et al. | |
| 2005/0234811 A1 | 10/2005 | Herman et al. | |

(Continued)

FOREIGN PATENT DOCUMENTS

| | | |
|---|---|---|
| JP | 2001117851 A | 4/2001 |
| KR | 20000063889 A | 11/2000 |
| KR | 20010084050 A | 9/2001 |

OTHER PUBLICATIONS

Official Communication for U.S. Appl. No. 12/399,796 mailed Jul. 22, 2011.

(Continued)

*Primary Examiner* — Luis A Brown
(74) *Attorney, Agent, or Firm* — Kilpatrick Townsend & Stockton LLP

(57) ABSTRACT

A system, method, apparatus and processor readable media are described for real-time prediction of an advertising audience volume through analysis of historical audience data, and tuning of the predicted audience volume. Embodiments enable a user to specify a query for audience volume prediction. Such a query may be a Boolean combination of various audience categories. A time range may be determined that indicates the amount of historical data that is to be analyzed to make the audience volume prediction in real time. Employing the user-specified query, an audience volume prediction may be provided for a future time period, based on an analysis of retrieved historical audience data for the time range. Embodiments may also enable a user to tune the predicted audience volume through modification of the query through one or more iterations.

44 Claims, 7 Drawing Sheets

(56) References Cited

U.S. PATENT DOCUMENTS

| | | |
|---|---|---|
| 2006/0041500 A1 | 2/2006 | Diana et al. |
| 2006/0195385 A1 | 8/2006 | Khetrapal et al. |
| 2006/0200360 A1 | 9/2006 | Razletovskly |
| 2006/0282533 A1* | 12/2006 | Steelberg et al. ............ 709/224 |
| 2007/0162377 A1 | 7/2007 | Williams |
| 2008/0046581 A1* | 2/2008 | Molina .................. H04L 63/08 |
| | | 709/229 |
| 2008/0077505 A1 | 3/2008 | Ilechko et al. |
| 2008/0189169 A1* | 8/2008 | Turpin et al. ................... 705/10 |
| 2008/0201205 A1 | 8/2008 | Rose et al. |
| 2008/0235243 A1* | 9/2008 | Lee .................. G06F 17/30867 |
| 2008/0249832 A1* | 10/2008 | Richardson et al. ........... 705/10 |
| 2008/0275753 A1 | 11/2008 | Protheroe et al. |
| 2009/0070334 A1* | 3/2009 | Callahan .............. G06F 21/604 |
| 2009/0076907 A1* | 3/2009 | Litwin et al. .................... 705/14 |
| 2009/0094196 A1* | 4/2009 | Piwowarski et al. ............. 707/3 |
| 2009/0228397 A1 | 9/2009 | Tawakol et al. |
| 2010/0057556 A1 | 3/2010 | Rousso et al. |
| 2010/0125665 A1* | 5/2010 | Simpson ............ G06F 11/3409 |
| | | 709/224 |
| 2010/0198655 A1 | 8/2010 | Ketchum et al. |
| 2010/0293057 A1* | 11/2010 | Haveliwala et al. ...... 705/14.66 |
| 2010/0325276 A1* | 12/2010 | Aarni ........................ G06F 9/54 |
| | | 709/226 |
| 2011/0035273 A1 | 2/2011 | Parikh et al. |
| 2011/0106616 A1* | 5/2011 | Bigby .................... G06Q 30/02 |
| | | 705/14.49 |
| 2011/0119136 A1* | 5/2011 | Eldreth et al. ............. 705/14.69 |
| 2011/0131205 A1* | 6/2011 | Iyer et al. ..................... 707/728 |
| 2011/0137953 A1* | 6/2011 | Bobick ..................... G06F 8/60 |
| | | 707/799 |
| 2011/0225026 A1* | 9/2011 | Ketchum ..................... 705/14.4 |
| 2011/0302236 A1* | 12/2011 | Shrum, Jr. ......... H04N 21/2343 |
| | | 709/203 |
| 2011/0302274 A1* | 12/2011 | Lee .................. H04N 21/25816 |
| | | 709/217 |
| 2012/0042001 A1* | 2/2012 | Carter ................... G06Q 10/10 |
| | | 709/202 |
| 2012/0047013 A1 | 2/2012 | Bigby et al. |
| 2012/0054627 A1* | 3/2012 | Priyadarshan ......... G06Q 30/02 |
| | | 715/738 |

OTHER PUBLICATIONS

International Search Report and Written Opinion for International Patent Application No. PCT/US2009/036387 mailed Oct. 8, 2009.
Official Communication for U.S. Appl. No. 12/399,796 mailed Dec. 12, 2013.
Official Communication for U.S. Appl. No. 12/399,796 mailed Mar. 27, 2013.
Official Communication for U.S. Appl. No. 12/399,796 mailed Aug. 2, 2013.
Official Communication for U.S. Appl. No. 12/860,789 mailed Oct. 2, 2012.
Official Communication for U.S. Appl. No. 12/860,789 mailed Jan. 15, 2013.
Official Communication for U.S. Appl. No. 12/860,789 mailed Mar. 28, 2013.
Final Office Action for U.S. Appl. No. 12/399,796 dated May 14, 2014, 31 pages.
Advisory Action for U.S. Appl. No. 12/399,796 dated Oct. 2, 2013, 3 pages.
Official Communication for U.S. Appl. No. 12/399,796 mailed Feb. 3, 2011.
Non-final Office Action for U.S. Appl. No. 12/860,812 dated Apr. 9, 2014, 17 pages.
Final Office Action dated Jul. 28, 2015 for related U.S. Appl. No. 12/860,789.
Non-final Office Action for U.S. Appl. No. 12/860,789 dated Jan. 7, 2015.
Non-final Office Action for U.S. Appl. No. 12/399,796 dated Mar. 25, 2015.
Final Office Action dated Oct. 29, 2015 for related U.S. Appl. No. 12/399,796.
Advisory Action for related U.S. Appl. No. 12/399,796 dated Mar. 23, 2016.

* cited by examiner

REAL TIME AUDIENCE FORECASTING

FIELD OF ART

The present invention is directed to managing an exchange of information, and more particularly, to using historical advertising audience data to predict in real time a future audience volume based on a user-specified query.

BACKGROUND

Information regarding users of web sites (e.g. a consumer or potential consumer) is often a hidden and fragmented entity on the web. In some situations, an advertiser or web publisher may not have access to information for one or more web users' behavior on various sites on the web. Further, an advertiser may not be able to predict in real-time the available size of the target audience for a proposed data and/or advertising campaign. It is with respect to these considerations and others that the present invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein.

DETAILED DESCRIPTION OF EMBODIMENTS

Figure 1:
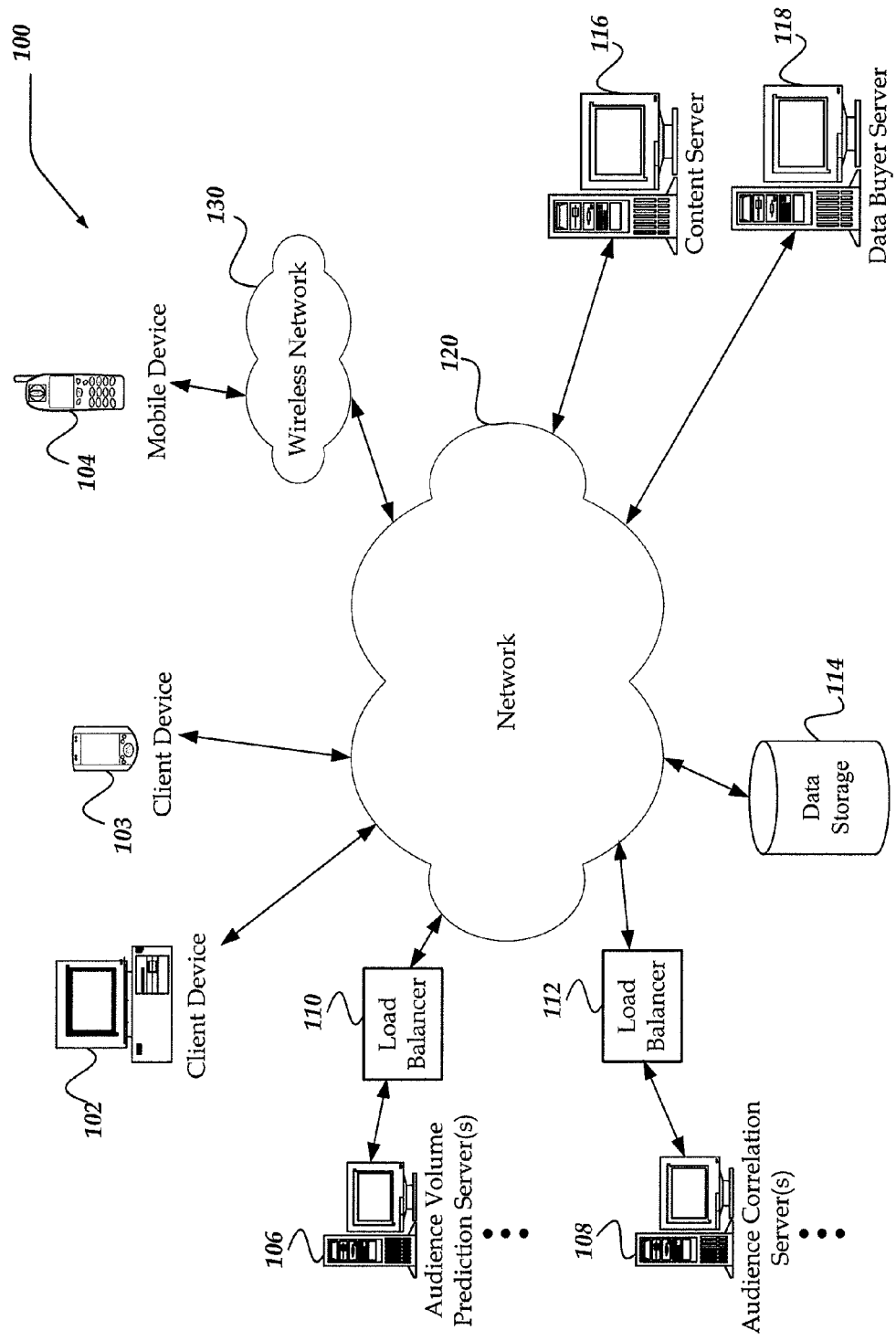
FIG. 1 illustrates an example of a system in which embodiments of the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, media or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term audience generally refers to a collection of people who have exhibited in the past or are likely to exhibit in the future a set of online or offline behaviors and actions, have otherwise directly or indirectly communicated and/or exhibited a predisposition towards or predilection for certain products, events, or entities, and/or have directly or indirectly indicated their affinity, inclusion or exclusion in certain groups (e.g. demographic) or categories. Lack of behavior and negative affinity could also be used as defining qualities of an audience. Such people may be web users who have exhibited certain online behavior (e.g. browsing, search, purchase, Really Simple Syndication (RSS) feed, social network activity, forum posting, and the like).

The term audience may also refer to or incorporate a set of users who have visited a particular website or set of websites. Examples of audience of this type include a) people who visited a specific online bookstore website, and b) women interested in green technology who visited three pre-specified automobile comparison websites sometime in the last month. The latter example combines demographic, site-visiting, and in-market audience components. Some embodiments may enable the user requesting the audience forecast to issue queries related to their own website(s) (e.g. for retargeting purposes). For example, an audience may be defined as women between the ages of 30 and 50, who are in market for European travel, and who have visited my website A but not my website B in the last 60 days.

In some embodiments, various audience components may be pertinent to an advertising campaign, data modeling, audience analysis and optimization, and the like.

The term audience may also refer to the collection of people who see, experience, or are otherwise exposed to or potentially exposed to a campaign such as an advertising campaign, a promotional campaign, an informational campaign, or the like. Such people may be web users who may experience a campaign through advertisements placed on web sites or other web services. Such people may also be consumers who may be exposed to advertising through virtually any medium, including but not limited to television, radio, print, physical displays, and the like. As used herein, person is a broad term that encompasses an individual who may be potentially exposed to a campaign through any media. A person may also be referred to as a consumer, which is meant broadly as a person who may purchase, express an interest in, or otherwise to exposed to information regarding a good and/or service for sale or otherwise provided at any time during the past, present and/or future.

As used herein, the term audience volume generally refers to a number of people in an audience. In some embodiments, audience volume may be an exact number of individual people. However, the invention is not so limited. In some embodiments, audience volume may be a more or less approximate count of the number of people in an audience, estimated by virtually any estimation process.

As used herein, the term category generally refers to a subject or a topic of data for people in an audience. For example, data for a person who purchased an SUV may be associated with a category of "SUV consumer" and/or broader categories of "automobile consumer" or "light truck consumer." Further, categories may be associated with broad category types. For example, categories related to particular markets for goods and/or services may be classified into a market or in-market type of category. Demographic type categories may include categories related to virtually any demographic statistic, including but not limited to age and gender of a person. Location type categories may be related to geographical location definitions of varying scope. For example, location type categories may include "United States residents", "west coast U.S. residents", "California residents", "Los Angeles County residents", "Burbank residents", and so forth. Seasonal category types may include categories related to particular times of year, seasons, periods of time, and the like. For example, data related to user activities during the winter may be classified in a winter category. Visitorship categories may include categories related to particular visits to certain websites, subsections of websites, collections of websites, classes and/or categories of websites, and the like. For example, users who have visited www.abcdef.com may be classified as "visitors to the ABCDEF website". Other types of categories may be supported by embodiments without departing from the scope or spirit of the claimed invention.

As used herein, the term user generally refers to a person who is acting as a user of the claimed invention, for example a user who is specifying a query for audience volume prediction, receiving the results of the audience volume prediction, and/or modifying the query to tune the audience volume prediction. In some embodiments, the user may be a data buyer seeking an audience volume prediction prior to launching an advertising campaign to target a particular audience.

As used herein, the term "time period" may generally refer to either a contiguous or non-contiguous period of time. A time period may be specified in terms of specific time(s) of day (e.g. 1:00 pm), general time(s) of day (e.g. afternoon), date(s), day(s) of the week (e.g. Tuesday), types of day(s) of the week (e.g. weekday, weekend), month(s) of the year, season(s) of the year, holiday(s), holiday season(s), and the like. A time period may be a specified range of time (e.g. from date X to date Y), a span of time immediately prior to or before a particular date (e.g. the month prior to date X), or a span of time generally prior to a particular date (e.g. any month prior to date X). A time period may be non-contiguously defined as omitting dates (e.g. the month prior to date X except for weekend days). In general, time period as used herein may encompass virtually any description of time.

Briefly stated, embodiments of the invention are directed toward real-time prediction of an advertising audience volume (e.g. audience forecasting) through analysis of historical audience data, and tuning thereof to predict audience volume. Some embodiments may enable a user to specify a query to define an audience for audience volume prediction. Such a query may be a Boolean combination of various audience categories. Further a time range may be determined that indicates the amount (e.g. the last week, last month, last year, and the like) of historical data that is to be analyzed to make the audience volume prediction. Employing the user-specified query, an audience volume prediction may be provided for a future time period, based on an analysis of retrieved historical audience data for the time range. Embodiments may also enable a user to tune the predicted audience volume and/or the desired audience definition through modification of the query during one or more iterations, until the user is satisfied with the predicted audience volume. Parallel processing of data retrieval and/or analysis of data by a cluster of servers may enable predictions of audience volume to be provided in real time.

As an example of iterative audience tuning, a user may specify an original query of "online consumers who are female, interested in Luxury Cars, and live in the Southern U.S." The original query may yield an audience volume (e.g. inventory) of two million persons. The user may then tune the query by changing the location criterion in the original query, for example to " . . . in the Southern OR Western U.S. AND not in California OR Alabama." This tuned query may yield a different audience volume of four million persons. Such tuning is described further herein with regard to FIGS. 4-7.

In some embodiments, the predicted audience volume may be considered an audience inventory, such that the audience volume prediction may be used to sell audience data to a potential customer such as an advertiser or other data buyer for a future advertising, promotional, and/or informational campaign. However, the invention is not so limited. In some embodiments, an audience volume prediction may be employed for market research and/or other purposes that are not directly commercial in nature.

Example Operating Environment

FIG. 1 illustrates an embodiment of a system in which embodiments of the present invention may operate. However, not all of the components in the depicted system may be required to practice the invention, and variations in the arrangement and type of the components may be made without departing from the spirit or scope of the invention.

As shown in the figure, system 100 includes client devices 102-103, mobile device (e.g. mobile client device) 104, network 120, wireless network 130, one or more audience volume prediction servers 106, one or more audience correlation servers 108, load balancers 110 and 112, data storage 114, content server 116 and data buyer server 118. Network 120 is in communication with and enables communication between each of the elements of system 100. Wireless network 130 further enables communication with wireless devices such as mobile device 104.

Client devices 102-104 may include virtually any computing device capable of receiving and sending a message over a network, and/or to and from another computing device. The set of such devices may include devices that typically connect using a wired communications medium such as personal computers, multiprocessor systems, microprocessor-based or programmable consumer electronics, network PCs, and the like. Further, client devices 102-104 may include any device that is capable of connecting via a wireless communication medium such as a personal digital assistant (PDA), pocket PC, wearable computer, portable computing device, mobile computing device, cell phones, smart phones, pagers, walkie talkies, radio frequency (RF) devices, infrared (IR) devices, citizen band (CB) radio devices, or any other device that is equipped to communicate over a wireless communication medium. Client devices may also include integrated devices combining one or more of the preceding devices and/or elements of one or more of the preceding devices.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a Handheld Device Markup Language (HDML), such as Wireless Markup Language (WML), WMLScript, JavaScript, and the like. Client devices 102-104 may further include a messaging application configured to send and/or receive a message to/from another computing device employing another mechanism, including, but not limited to instant messaging (IM), email, Short Message Service (SMS), Multimedia Message Service (MMS), internet relay chat (IRC), mIRC, Jabber, and the like.

Network 120 is configured to couple one computing device to another computing device, enabling them to communicate. Network 120 is enabled to employ any form of computer readable media for communicating information from one electronic device to another. Also, network 120 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router, switch and/or other network appliance may act as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 120 is constructed for use with various communication protocols and technologies, including transmission control protocol/internet protocol (TCP/IP), user datagram protocol (UDP), a wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like. In essence, network 120 includes any communication method by which information may travel between the various devices of system 100. Network 120 may further include one or more network management devices, which may include network providers, load balancers, application managers, or the like. Network management devices may manage communication sessions, tag communication traffic, place data cookies on client devices, and perform other network management operations.

Wireless network 130 may include wireless interfaces, wireless forms of communication media, and/or wireless links such as cellular networks, satellite links. These may include wireless application protocol (WAP), global system for mobile communications (GSM), code division multiple access (CDMA), time division multiple access (TDMA), general packet radio service (GPRS), ultra wide band (UWB), IEEE 802.16 Worldwide Interoperability for Microwave Access (WiMax), and the like.

The media used to transmit information in communication links as described above may generally include any media that can be accessed by a computing device. Such computer-readable media may include non-transitory media such as computer readable storage media, which also may be referred to as processor readable storage media. Computer-readable media may also include transitory wired and/or wireless communication media, or any combination thereof. Additionally, computer-readable media typically embodies computer-readable instructions, data structures, program modules, or other data. Such data may be stored on computer readable storage media. Such data may also be communicated through communication media in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as fluids or space for acoustic, RF, infrared, and other wireless signals, and wired media such as twisted pair, coaxial cable, fiber optics, wave guides, and other wired media.

Audience volume prediction server(s) 106, audience correlation server(s) 108, content server 116, and/or data buyer server 118 may comprise multiple computing devices, components of a single computing device, or a single device with multiple software features. In some embodiments, audience volume prediction server(s) 106 and/or audience correlation server(s) 108 may comprise a cluster of server, such that the audience volume prediction and audience correlation functionality is shared among the servers of the cluster in a load-balanced and/or parallel processing. In some embodiments, system 100 may include load balancers 110 and 112 or other network devices that manage the load balancing of tasks among audience volume prediction server(s) 106 and/or audience correlation server(s) 108 respectively.

In some embodiments, audience volume prediction server(s) 106 and/or audience correlation server(s) 108 may use external data storage 114 for storing audience data used for audience volume prediction and/or audience correlation. In some embodiments, audience volume prediction server(s) 106 and/or audience correlation server(s) 108 may use internal data storage for storing audience data.

Content server 116 may provide content such as web sites, online journals (e.g., blogs), photos, reviews, online services such as messaging, search, news, shopping, advertising, travel services, or virtually any other content and/or services. While providing such content or services, content server 116 may gather information about persons who access the provided content (e.g., web users, consumers and/or potential consumers), including but not limited to information such as products viewed or purchased, services viewed or purchased, articles read, content searches and the like. The gathered information may be collected, stored, correlated, or otherwise analyzed at an exchange server (not shown in FIG. 1). Such an exchange server and exchange service is described further in U.S. patent application Ser. No. 12/399,796, titled EXCHANGE FOR TAGGED USER INFORMATION WITH SCARCITY CONTROL, hereby incorporated by reference. Briefly, an exchange server may organize or reorganize the consumer information collected from one or more content servers such as content server 116. An exchange server may facilitate the selling or providing of the collected consumer information to one or more buyers, by auction or otherwise. In some embodiments, data buyer server 118 may generally enable buyers to review, bid on, or otherwise access the collected consumer information. In some embodiments, the collected consumer information may be audience data used by audience volume prediction server(s) 106 and/or audience correlation server(s) 108.

System 100 may also include data buyer server 118 that enables a data buyer or potential data buyer to use services provided by audience volume prediction server(s) 106 and/ or audience correlation server(s) 108. In some embodiments, a user of data buyer server 118 may access client application(s) installed on data buyer server 118 to access services provided by audience volume prediction server(s) 106 and/ or audience correlation server(s) 108, as discussed further herein. In some embodiments, a user of data buyer server 118 may access remote and/or network application(s) hosted on audience volume prediction server(s) 106 and/or audience correlation server(s) 108 to access services.

Example Client Device

Figure 2:
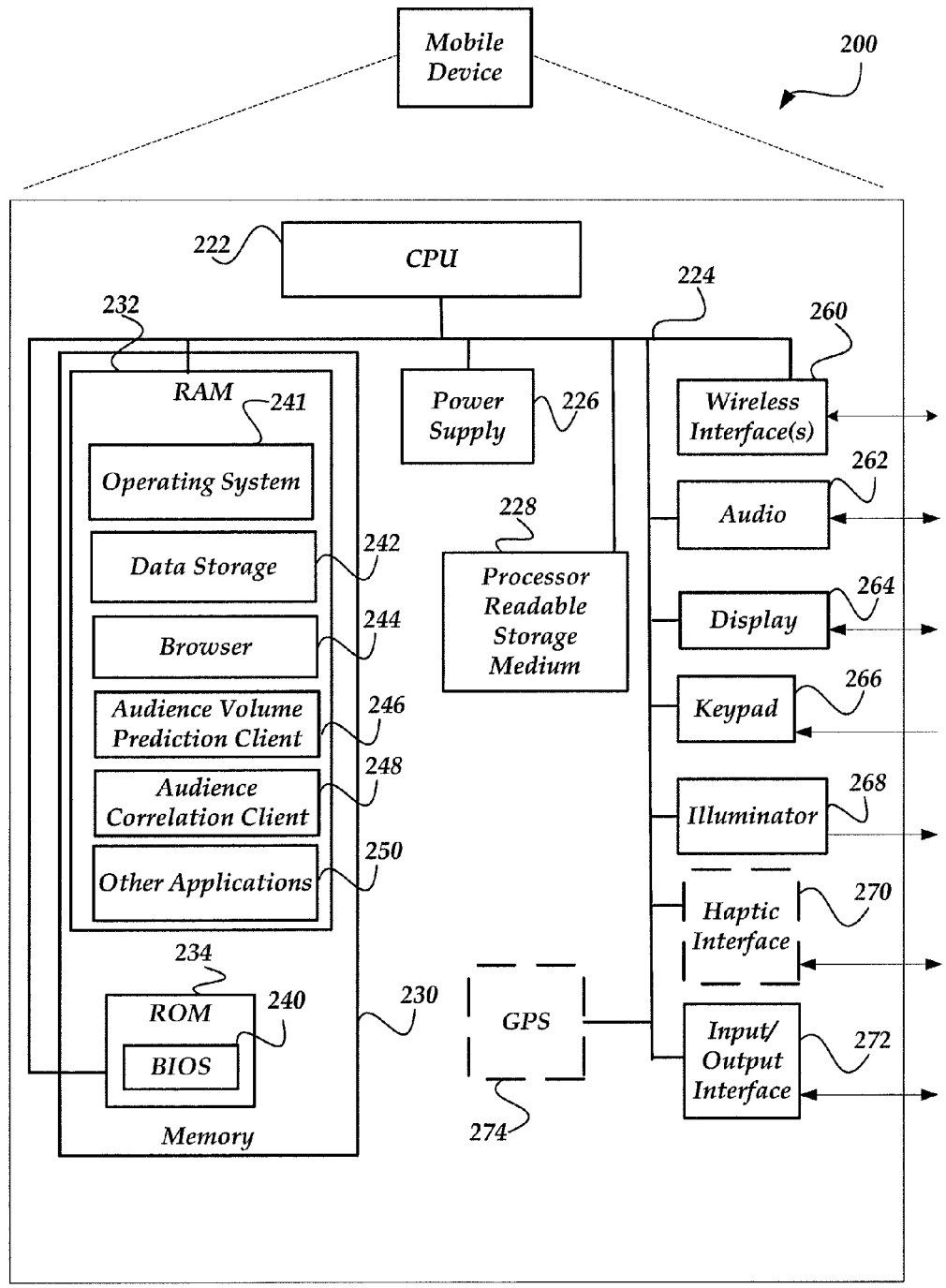
FIG. 2 illustrates an example of a mobile device that may be included in a system implementing embodiments of the invention.

FIG. 2 shows an example mobile device 200, according to an embodiment of the claimed invention. In one embodiment, mobile device 200 is a mobile client device, such as a laptop computer. Another example of a mobile device is a PDA or a cellular telephone that is arranged to send and receive voice communications and messages such as SMS messages via one or more wireless communication interfaces. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Generally, mobile device 200 may comprise any mobile or stationary electronic device. Such devices include personal computers, laptops, palmtops, PDAs, handheld computers, cellular telephones, smart phones, pagers, radio frequency (RF) devices, infrared (IR) devices, integrated devices combining one or more of the preceding devices, and the like. Mobile device 200 may also comprise other electronic devices such as multiprocessor systems, microprocessor-based or programmable consumer electronics, network PCs, wearable computers, and the like.

Mobile device 200 may include many more, or fewer, components than those shown in FIG. 2. However, the components shown are sufficient to disclose an illustrative embodiment for practicing the present invention. As shown in the figure, mobile device 200 includes a central processing unit (CPU) 222 in communication with a mass memory 230 via a bus 224.

Mass memory 230 may include RAM 232, a ROM 234, and other storage means. Mass memory 230 illustrates an example of computer storage media for storage of information such as computer readable instructions, data structures, program modules or other data. Mass memory stores a basic input/output system ("BIOS") 240 for controlling low-level operation of client device 200. The mass memory also stores an operating system 241 for controlling the operation of mobile device 200. It will be appreciated that this component may include a general purpose operating system such as a version of Windows®, UNIX, or LINUX®, or a specialized mobile communication operating system such as Windows Mobile™, the Symbian® operating system, or the like. The operating system may include, or interface with a Java® virtual machine module that enables control of hardware components and/or operating system operations via Java application programs.

Memory 230 further includes one or more data storage units 242, which can be utilized by mobile device 200 to store data used by various programs, applications, software modules, and the like. Mass memory 230 may also include programs, applications, and/or software modules. Browser 244 may run under the control of operating system 241 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web.

Mass memory 230 may also include an audience volume prediction client 246 that enables a user to access audience volume prediction functionality of the claimed invention, provided by audience volume prediction server(s) 106, described further herein. In some embodiments, mass memory 230 may also include an audience correlation client that enables a user to access audience correlation functionality provided by audience correlation server(s) 108. In some embodiments, a user of mobile device 200 may access audience volume prediction functionality and/or audience correlation functionality through browser 244, by accessing web services hosted by audience volume prediction server(s) 106 and/or audience correlation server(s) 108. In some embodiments, access to functionality of the audience volume prediction server(s) and/or audience correlation server(s) may be provided to the client via an application program interface (API). A data buyer and/or third party may create one or more applications that employ the API to access the prediction and/or correlation functionality. Mass memory 230 may also include other applications 250.

Mobile device 200 may also include a processor readable storage media 228. Processor readable storage media may include volatile, nonvolatile, removable, and non-removable media implemented in any method or technology for storage of information, such as computer- or processor-readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device. Processor readable storage media may also be referred to herein as computer readable storage media.

Mobile device 200 also includes a power supply 226, one or more wireless interfaces 260, an audio interface 262, a display 264, a keypad 266, an illuminator 268, an input/ output interface 272, an optional haptic interface 270, and an optional global positioning systems (GPS) receiver 274. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station, or directly with another mobile device. Wireless interface 260 may include circuitry for coupling mobile device 200 to one or more wireless networks, and is constructed for use with one or more communication protocols and technologies including, but not limited to, TCP/IP, UDP, GSM, CDMA, TDMA, SMS, GPRS, WAP, UWB, IEEE 802.16 (WiMax), and the like.

Audio interface 262 is arranged to produce and/or receive audio signals such as the sound of a human voice, music, and the like. For example, audio interface 262 may be coupled to a speaker and microphone (not shown) to enable telecommunication with others and/or generate an audio acknowledgement for some action. Display 264 may be a liquid crystal display (LCD), gas plasma, light emitting diode (LED), or any other type of display used with a client device. Display 264 may also include a touch sensitive screen arranged to receive input from an object such as a stylus or a digit from a human hand.

Keypad 266 may comprise any input device arranged to receive input from a user. For example, keypad 266 may include a keyboard, a push button numeric dial, or the like. Keypad 266 may also include command buttons that are associated with selecting and performing changeable processes. Illuminator 268 may provide a status indication and/or provide light. Illuminator 268 may remain active for specific periods of time or in response to events. For example, when illuminator 268 is active, it may backlight the buttons on keypad 266 and stay on while the client device is powered. Also, illuminator 268 may backlight these buttons in various patterns when particular actions are performed, such as dialing another client device. Illuminator 268 may also cause light sources positioned within a transparent or translucent case of the mobile device to illuminate in response to actions.

Client device 200 may also include input/output interface 272 for communicating with external devices, such as a headset, or other input or output devices not shown in FIG. 2. Input/output interface 272 can utilize one or more communication technologies, such as USB, infrared, Bluetooth™, and the like. Optional haptic interface 270 is arranged to provide tactile feedback to a user of the client device. For example, the haptic interface may be employed to vibrate client device 200 in a particular way when another user of a client device is calling.

Optional GPS transceiver 274 can determine the physical coordinates of client device 200 on the surface of the Earth, which typically outputs a location as latitude and longitude values. GPS transceiver 274 can also employ other geopositioning mechanisms, including, but not limited to, triangulation, assisted GPS (AGPS), Enhanced Observed Time Difference (E-OTD), cell identifier (CI), service area identifier (SAT), enhanced timing advance (ETA), base station subsystem (BSS), or the like, to further determine the physical location of client device 200 on the surface of the Earth. It is understood that under different conditions, GPS transceiver 274 can determine a physical location within millimeters for client device 200; and in other cases, the determined physical location may be less precise, such as within a meter or significantly greater distances.

Example Network Device

Figure 3:
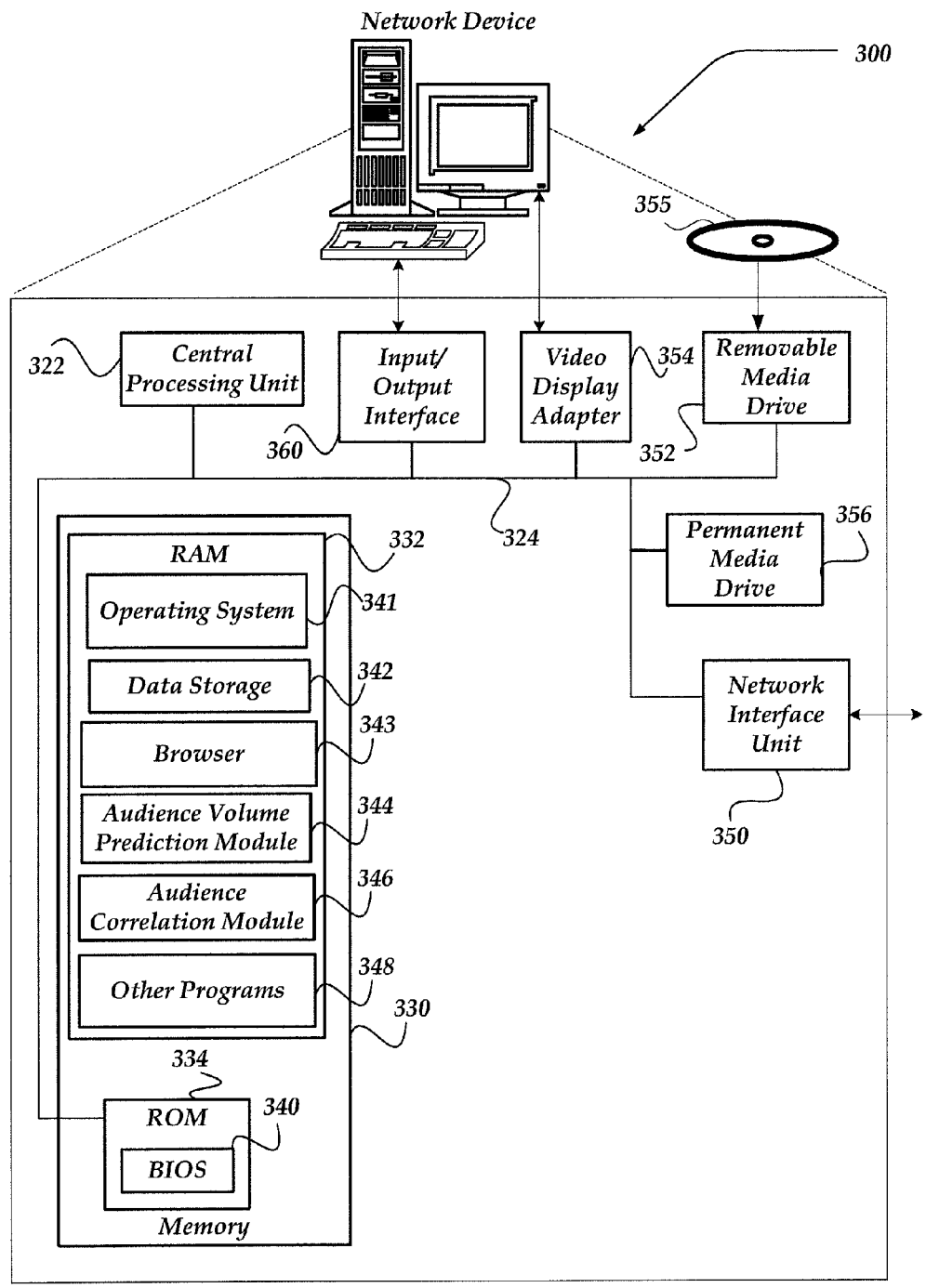
FIG. 3 illustrates an example of a network device that may be included in a system implementing embodiments of the invention.

FIG. 3 shows one embodiment of a network device, according to one embodiment of the invention. Network device 300 may include many more, or fewer, components than those shown. The components shown, however, are sufficient to disclose an illustrative embodiment for practicing the invention. Network device 300 may represent, for example, audience volume prediction server(s) 106, audience correlation server(s) 108, client devices (e.g. desktop personal computers) such as client device 102, content server 116, and/or data buyer 118 of FIG. 1.

As shown in FIG. 3, network device 300 includes a CPU 322 in communication with a mass memory 330 via a bus 324. Mass memory 330 may include RAM 332, a ROM 334, and other storage means. Mass memory 330 illustrates an example of computer storage media for storage of information such as computer readable instructions, data structures, program modules or other data. Mass memory stores a basic input/output system ("BIOS") 340 for controlling low-level operation of network device 300. The mass memory also stores an operating system 341 for controlling the operation of network device 300. It will be appreciated that this component may include a general purpose operating system such as a version of Windows®, UNIX, or LINUX®, or a specialized mobile communication operating system such as Windows Mobile™, the Symbian® operating system, or the like. The operating system may include, or interface with a Java® virtual machine module that enables control of hardware components and/or operating system operations via Java application programs.

Memory 330 further includes one or more data storage units 342, which can be utilized by network device 300 to store programs, applications, software modules, and the like, as well as the data used by such programs, applications, and/or software modules. Programs may comprise computer executable instructions which can be executed by network device 300. Programs in mass memory 330 may include a browser application 343. Browser 343 may run under the control of operating system 341 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web. Mass memory 330 may also include an audience volume prediction module 344 that enables audience volume prediction functionality of the claimed invention, provided by audience volume prediction server(s) 106, described further herein. In some embodiments, mass memory 330 may also include an audience correlation client that enables audience correlation functionality provided by audience correlation server(s) 108. Mass memory 330 may also include other applications 348. Other examples of application programs include content management applications, messaging applications, schedulers, calendars, web services, transcoders, database programs, word processing programs, spreadsheet programs, and so forth. Accordingly, programs may process images, audio, video, or markup pages, enable telecommunication with another user of another electronic device, and/or other services.

Server device 300 also includes an input/output interface 360 for communicating with input/output devices such as a keyboard, mouse, wheel, joy stick, rocker switches, keypad, printer, scanner, and/or other input devices not specifically shown in FIG. 3. A user of server device 300 can use input/output devices to interact with a user interface that may be separate or integrated with operating system 341, and/or programs in memory 330. Interaction with the user interface includes visual interaction via a display, and a video display adapter 354.

Server device 300 may include a removable media drive 352 and/or a permanent media drive 354 for computer-readable storage media. Removable media drive 352 can comprise one or more of an optical disc drive, a floppy disk drive, tape drive, and/or any other type of removable media drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 355, digital versatile disks (DVD) or other optical storage, magnetic cassettes, magnetic tape, magnetic disk storage or other magnetic storage devices, RAM, ROM, EEPROM, flash memory or other memory technology, or any other media which can be used to store the desired information and which can be accessed by a computing device.

Removable media drive 352 and/or permanent media drive 356 may also include processor readable storage media. Processor readable storage media may include volatile, nonvolatile, removable, and non-removable media implemented in any method or technology for storage of information, such as computer- or processor-readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device. Processor readable storage media may also be referred to herein as computer readable storage media.

Via a network communication interface unit 350, server device 300 can communicate with a wide area network such as the Internet, a local area network, a wired telephone network, a cellular telephone network, or some other communications network, such as networks 120 and/or 130 in FIG. 1. Network communication interface unit 350 is sometimes known as a transceiver, transceiving device, network interface card (NIC), and the like.

Example Operations

Figure 4:
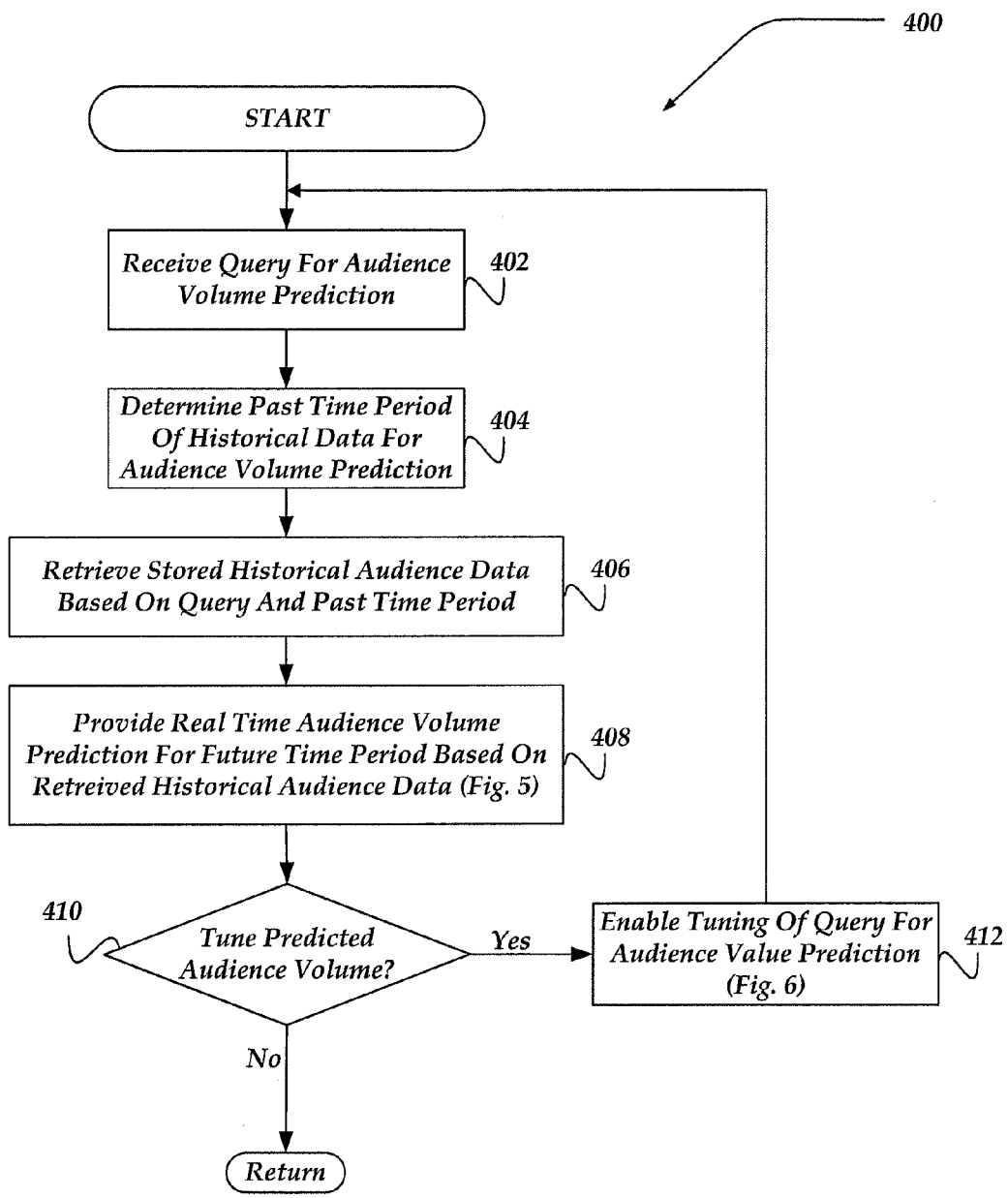
FIG. 4 illustrates a logical flow diagram generally showing an embodiment of a process for tuning a predicted audience volume.

FIG. 4 illustrates a logical flow diagram generally showing an embodiment of a process 400 for tuning a predicted audience volume. In some embodiments, this process may be implemented by and/or executed on a network device such as audience volume prediction server(s) 106 of FIG. 1, via an application such as audience volume prediction module 344 of FIG. 3.

After a start block, a query for audience volume prediction is received at block 402. In some embodiments, the query may be specified or otherwise provided by the user. However, the invention is not so limited, and the query may also be provided by an operator, administrator or other person controlling audience volume prediction server(s). In some embodiments, the query may include one or more categories of consumer data along with one or more Boolean operators. The specified categories of consumer data may be of various category types, including but not limited to market categories, demographic categories, location categories, season categories, and the like. For example, the user may specify a query of "location=California AND market=SUV purchaser" to query for consumer data on purchasers of SUVs who live in California. As another example, the user may specify a query of "location=California OR Oregon AND market=video game console" to query for consumer data on purchasers of (or individuals who evinced an interest in) video game consoles who live in California or Oregon. In some embodiments, a query may include Boolean operators and/or weighted categories. For example, a user may specify a query of "market=LuxuryCars (with 80% confidence) AND gender=Male (with 90% confidence). On receiving the user specified query, the query may be stored in mass memory.

The query received at block 402 may be received as part of a request for a real time prediction of an advertising audience volume over a future time period. Such a request may, in some embodiments, be received from a user. In some embodiments, the request may be received from an administrator, operator, or other person in control of audience volume prediction server(s). In some embodiments the request may also include the future time period. In some embodiments, where the request does not include a future time period, a default future time period (e.g. one month in the future from a current date) may be employed. One or both of the query and the future time period may be editable by the user, and/or by the administrator, operator, or controller.

At block 404, a past time period of historical data for audience volume prediction may be provided or otherwise determined. In some embodiments, such a past time period may be specified as a recency (e.g., the last week, the last month, the last year, and the like). In some embodiments, the past time period may be specified as a range of dates (e.g. Jan. 1, 2010 through Jun. 30, 2010). In some embodiments, the past time period of historical data may be set as a parameter or set of parameters by an operator, administrator and/or manager for process 400. In some embodiments, the past time period of historical data may be received from and/or specified by a user of process 400 (e.g. a data buyer seeking an audience volume prediction). In some embodiments, the past time period may be editable by at least one of the user or the administrator, operator, or controller.

At block 406, stored historical audience data may be retrieved based on the query and/or past time period. In some embodiments, retrieval of data may be made from a database or other data store, such as data storage 110 and/or data stored in mass memory of audience volume prediction server(s) 106 of FIG. 1. In some embodiments, the historical audience data retrieved may be based on the past time period of historical data determined at block 404. Moreover, in some embodiments, the historical audience data retrieved may include a plurality of historical advertising audience volumes.

Some embodiments may support fast, real-time audience forecasting through the employment of a cluster of one or more computers. Such a cluster may be employed to store relevant historical data in main memory for optimal (e.g. fast) access. In some embodiments, memory usage may be optimize and/or cost minimized by configuring the computers such that least used portions of the data are stored on disk and brought to main memory and/or cache when they are accessed sufficiently frequently (e.g. above a certain threshold of number of accesses in a given period of time). Further, for additional speed-up and/or optimization, dynamic and/or static (e.g. user-specified, algorithmically determined, and/or pre-specified) data sampling may be employed to provide audience volume predictions of a certain pre-determined granularity and/or confidence level.

At block 408, a real time audience volume prediction for a future time period may be generated and/or provided based on the retrieved audience data and the future time period. In some embodiments, the future time period may be determined based on the past time period of historical data determined at block 404. For example, if the past time data of historical data is six months (e.g. the last six months from the current time, or a specified range of dates that is six months long), then the future time period may also be six months. In some embodiments, the future time period may be related to the past time period by a scale factor or a more complex mathematical function. For example, the future time period may be specified as 1.5 times the past time period. In some embodiments, a scaling factor may be used to adjust for a known seasonality effect; e.g., such as the effect that in May people are 1.5 times more likely to be interested in pool cleaning and other warm-weather-related products or services.

In some embodiments, the audience volume prediction is provided to the user as a number of persons (e.g. web users, consumers, potential consumers, and the like) that will be reached by an advertising campaign targeting persons according to the user specified query. Such an audience volume prediction may be specified as an exact number or as an approximate estimate of a number of persons. In some embodiments, the audience volume prediction may be provided as an estimated range of the number of persons in the predicted audience volume (e.g. from 10,000 to 20,000 persons). In some embodiments, such ranges may be determined as a range of forecasts that satisfies a pre-determined statistical confidence interval that may be specified by a user and/or an administrator of the system.

In some embodiments, generating the real time prediction for the future time period may be based on an evaluation of the query over the historical audience data retrieved at block 406. Such evaluation may include applying the query to the historical audience data to generate a subset of the data that corresponds to the query. In some embodiments, generating the real time prediction may include further analysis of the historical audience data.

Figure 5:
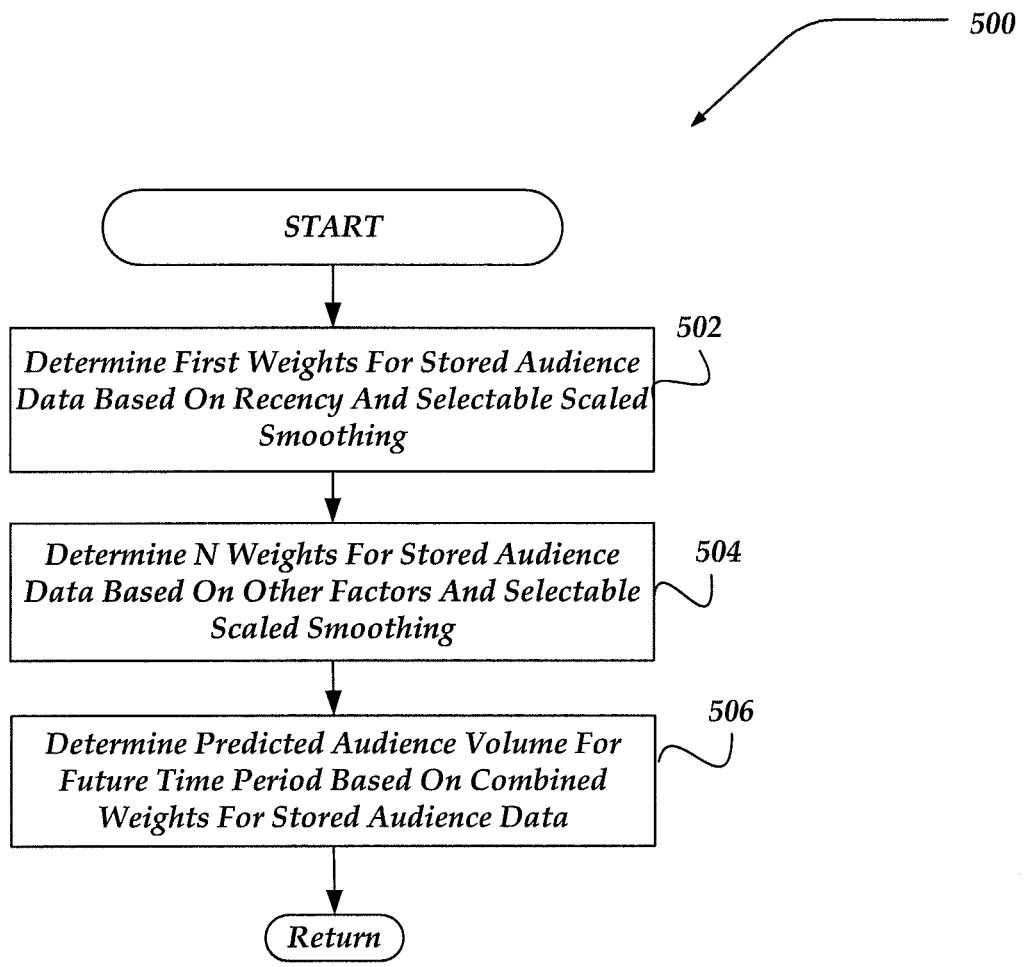
FIG. 5 illustrates a logical flow diagram showing an embodiment of a process for providing an audience volume prediction.

FIG. 5 provides an example of the analysis that may be performed to determine the audience volume prediction. After a start block, process 500 may proceed to block 502 where one or more first weights may be determined for the stored audience data based on recency and on a selectable scaled smoothing. In some embodiments, the first weights may be weighting factors that determine the weights given to the various data when calculating the predicted audience volume. In some embodiments, more recent data may be weighted for heavily than older data. For example, data collected in the last month may be weighted more heavily than data collected in the previous month, and so forth, as in the following table.

| Time period for collected data | Weighting factor (w) |
| --- | --- |
| One month ago until current time | w = 1.0 |
| Two months ago until one month ago | w = 0.8 |
| Three months ago until two months ago | w = 0.6 |
| Four months ago until three months ago | w = 0.4 |
| Five months ago until four months ago | w = 0.2 |

In this example, historical data is retrieved up until five months from the current time. In some embodiments, weighting based on recency may be considered a recency-based averaging of the historical data, and may function as a smoothing to account for more-or-less extreme changes in the rate of collection of historical data.

At block 504, a further N number of weights may be determined for the stored audience data based on other factors and on a selectable scaled smoothing. Such other factors may include but are not limited to: day of the week (e.g. data collected Saturday and Sunday is weighted different than data collected on weekdays), seasonality (e.g. data collected in the winter is weighted differently than data collected in the summer), special events (e.g. weighting related to holidays, natural disasters, entertainment events, and the like), and/or geographical factors (e.g. different weights for southern U.S. vs. eastern U.S.). In some embodiments, weighting may also be based on the source of the particular consumer data collected. For example, data collected from web site X may be weighted differently than data collected from web site Y.

At block 506, the predicted audience volume may be determined for the future time period based on combined weights for the stored audience data. In some embodiments, this determination may be performed through a calculation according to a particular algorithm. For example, predicted audience volume (PAV) may be calculated through a linear sum of weighted data:

$$PAV = p(1)*w(1) + p(2)*w(2) + p(3)*w(3) + \ldots p(n)*w(n)$$

where p(i) represents the historical data being analyzed and w(i) represents one or more weight factors applied to the particular data.

Although this example shows a linear sum, other algorithms may be contemplated without departing from the spirit or scope of the invention. For example, a quadratic algorithm or other polynomial expansion may be employed, and/or exponential, logarithmic, or virtually any other type of mathematical algorithm.

In some embodiments, the weights applied for recency and/or other factors may be non-uniform (e.g. different weights applied to different factors) and may be selectable by the user and/or by an implementer, operator and/or administrator of the audience volume prediction server.

Figure 7:
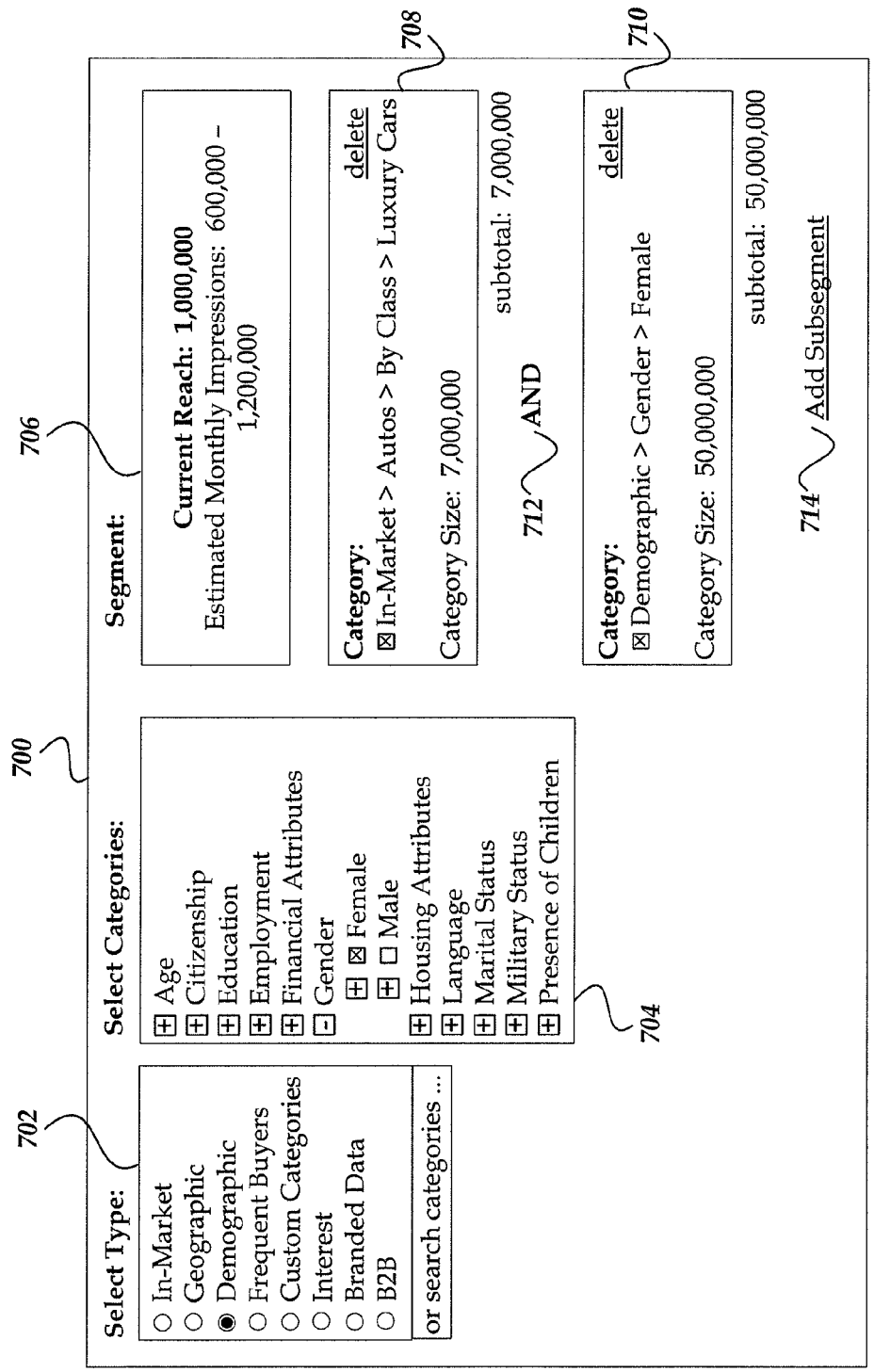
FIG. 7 illustrates an example user interface for audience volume prediction.

After the predicted audience volume has been determined, it may be provided to the user via a report screen or other means (described in more detail with regard to FIG. 7). In some embodiments, the predicted audience volume may be provided to the user as a number of persons that are predicted to be reached by the specified query for the determined future time period, and/or a range of an estimated number of persons predicted to be reached. In some embodiments, retrospective (e.g. historical) information may further be provided to the user. For example, the user may be provided with data specifying that a campaign according to the user specified query would have reached X persons had it been run during the past time period. Following block 506, process 500 may return.

In some embodiments, a confidence metric may be determined for the predicted audience volume. Such a confidence metric may be calculated as a percentage level of confidence (e.g. that the audience prediction is accurate to some threshold of accuracy such as 90%, 95%, and the like). In some embodiments, the confidence metric may be presented as a mathematical variance, standard deviation, sigma-level confidence, and the like. In some embodiments, the confidence metric may be presented in a subjective and/or descriptive manner that may be more readily understandable by the user (e.g. high confidence, medium confidence, low confidence). The confidence metric may be presented to the user along with the predicted audience via a report screen or other means (e.g. the user interface depicted in FIG. 7).

Returning to FIG. 4, a determination is made at decision block 410 whether the predicted audience volume is to be tuned. In some embodiments, this determination may be based on an indication from the user that the predicted audience volume is to be tuned. If so, at block 412 the user may be enabled to tune the query for audience volume prediction. Moreover, in embodiments where the user is enabled to specify the past time period for the retrieved and analyzed historical audience data, the user may further be enabled to tune the past time period (e.g. specify a different time period) at block 412. In some embodiments, the user may further be enabled to tune the future time period.

Figure 6:
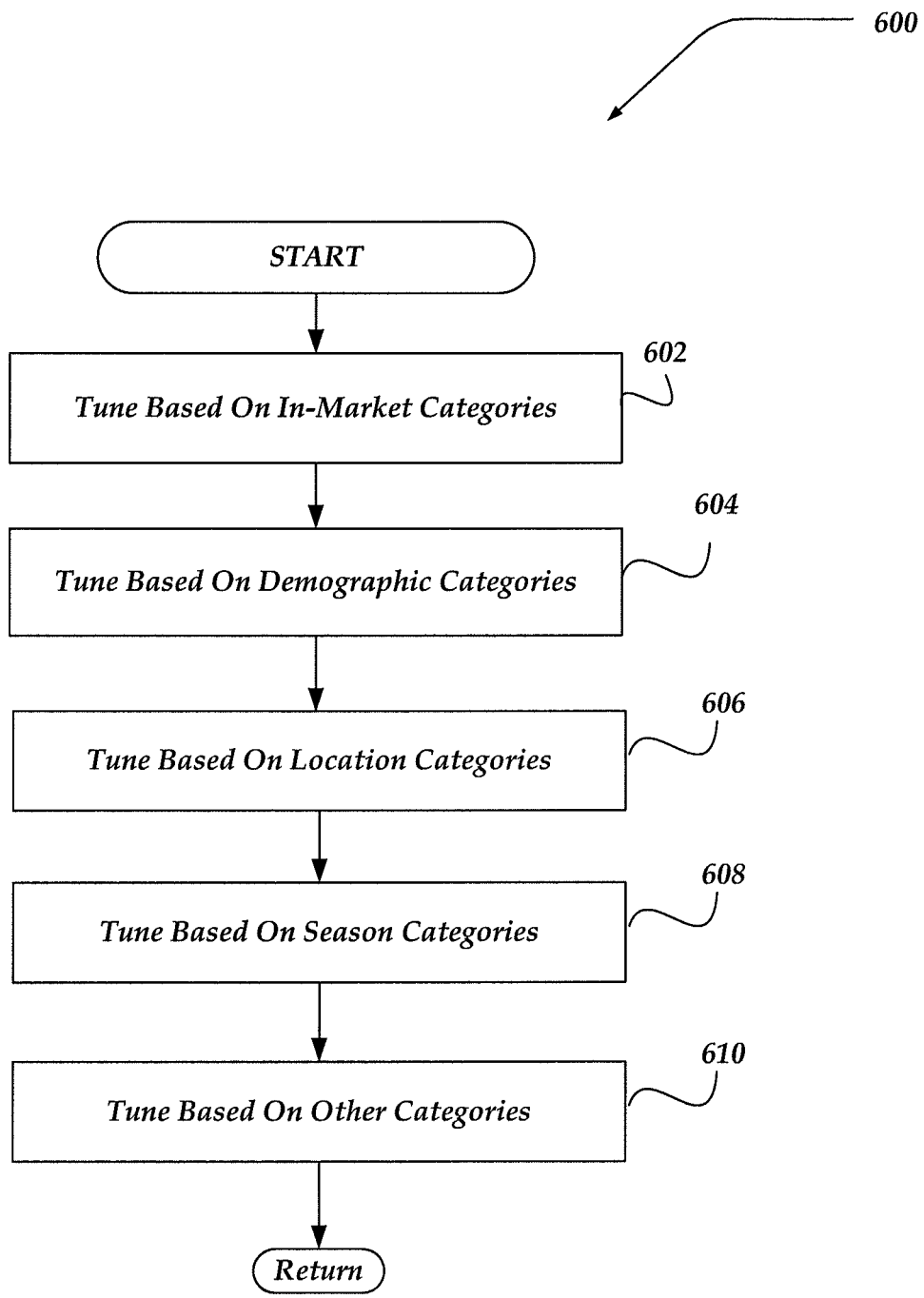
FIG. 6 illustrates a logical flow diagram showing an embodiment of a process for tuning of a query for audience volume prediction.

FIG. 6 provides a more detailed example of tuning of the query for audience volume prediction. After a start block process 600 proceeds to block 602, where a determination is made to tune based on one or more in-market (e.g. market) type categories in the user-specified query. For example, market type categories may categories for a consumer's purchase of and/or interest in goods and services related to travel, finance, retail purchases, automotive purchases, and virtually any other type of good or service. At block 602, the user may edit the query to change, add or remove in-market categories.

At block 604, a determination is made to tune based on one or more demographic type categories. Demographic type categories generally include categories associated with virtually demographic factor, including for example age and/or gender. At block 604, the user may edit the query to change, add or remove demographic categories.

At block 606, a determination is made to tune based on one or more location type categories. Location type categories generally include categories associated with geographic locations (e.g. continent, country, state, province, prefecture, county, city, neighborhood, address, and the like). At block 606, the user may edit the query to change, add or remove location categories.

At block 608, a determination is made to tune based on one or more seasonal type categories (e.g. seasons of the year). Season type categories may also include particular holiday seasons (e.g. a predetermined period of time prior to a holiday such as Christmas). Season type categories may also generally include categories related to particular time periods (e.g. months, weeks, days of the year, particular days of the week, and the like). At block 608, the user may edit the query to change, add or remove season type categories.

At block 610, a determination is made to tune based on other types of categories. In addition to editing the particular categories included in a query, the user may be enabled to change the Boolean operators used to combine the categories to form the query. For example, a user specified query of "location=California AND gender=male" may be tuned to "location=California OR gender=male". After block 610, process 600 may return.

Following the user's tuning of the query, process 400 may then return to 402 and repeat the process to regenerate the prediction of the advertising audience volume. In this way, process 400 may execute over one or more iterations during which the user specifies a query and a predicted audience volume is determined based on the query and the past time period. Such iterations may continue until the user is satisfied with the predicted audience volume, until a predetermined number of iterations have been executed, or until some other termination criterion or set of criteria is satisfied. At decision block 410, if the predicted audience volume is not to be tuned, process 400 may return.

In some embodiments, the audience volume prediction functionality is provided in real-time, such that the user is provided with an audience volume prediction within a certain period of time following specification of the query. In some embodiments, such period of time may be brief (e.g. more or less in real time from the perspective of the user). In some embodiments, the real-time provision of the audience volume prediction may include parallel processing of the retrieval of historical data and/or analysis of historical data by multiple servers in a cluster of audience volume prediction servers. In some embodiments, a level of service and/or quality of service may be used to determine a number of servers to be used for parallel processing of historical data and/or to make the real time prediction of audience volume. Such level of service and/or quality of service may be specified by the user and/or by an administrator, operator, controller, or the like. For example, if a user specifies a level of service that is a one second response time to a query, a certain number of servers may be allocated to process that request to achieve that level of service. Some speed up techniques may be determined by an implementer, operator, and/or administrator of the claimed invention to achieve a predetermined level of service and/or satisfy the real time quality of service requirements of the user.

In some embodiments, real time results may be achieved through memory management techniques employed on the one or more audience volume prediction servers and/or data storage. For example, infrequently accessed historical data may be stored on hard disk with slower access, and more frequently accessed historical data may be stored in memory with faster access. In this way, speed-up of processing may be achieved at lower cost (e.g. a certain result achieved using 1000 servers holding data in memory may be achieved with a substantially similar level of service using 10 servers storing at least a portion of the needed data on hard disk).

In some embodiments, real time results may be achieved through techniques that speed up the processing at the data retrieval and/or analysis phases of the process. For example, retrieval of historical data may include a sampling of the historical data instead of retrieval of a full data set. Further, analysis of the historical data may include analysis of a sample (e.g. subset) of the retrieved historical data. Sampling may be employed in such a way that the sample of data is a representative sample of a more complete historical data set, to ensure a result that is substantially similar to the result that would be achieved based on the more complete historical data set. In some embodiments, sampling may be performed to meet a user-specified level of server and/or quality of service. For example, to meet a level of service that is a one second response time, it may be necessary to retrieve and/or analyze 50% of the historical audience data.

In this way, level of service (e.g. response time), quality of service (e.g. accuracy and/or confidence level of result), and/or cost (e.g. number of servers or other resources employed) may be weighed and/or balanced against one another to ensure an appropriate level of service to the user. For example, a faster response time may require increased sampling of the historical data set, which may in turn lead to a lower confidence level of the result. In such circumstances, if both a fast response time and a high confidence level are required, additional servers may be employed to ensure a fast response time with a high confidence level. The cost of additional servers may be passed on to the user in the form of higher service fees and the like.

FIG. 7 illustrates an example user interface for audience volume prediction and/or calculation. Such a user interface may provide functionality that allows a user to specify a query for audience volume prediction, and provide in real-time an audience volume prediction for a future time period based on that query as well as a summary of historical audience volume for the specified query. In some embodiments, such a user interface may be provided to a user who is using data buyer server 118 and/or one or more of client devices 102-104 shown in FIG. 1. In some embodiments, such a user interface may be implemented through a set of APIs that are provided to the user from a server device such as audience volume prediction server(s) 106 shown in FIG. 1.

As shown in FIG. 7, user interface 700 includes various controls, dialogs, and other user interface elements to enable a user to specify a query for audience volume prediction. These may include a "Select Type" control 702 that enables a user to select one or more types of categories to include in the user-specified query. Such types of categories may include, but are not limited to, In-Market, Geographic, Demographic, Frequent Buyers, Custom Categories, Interest, Branded Data, Business-to-business (B2B), and the like. Selection of a category type through control 702 may include selection of a radio button or other control-type. In the example shown, the user has selected the Demographic category type. In some embodiments, control 702 may also include a dialog or other control to enable the user to search for categories and/or category types.

User interface 700 may further include a "Select Categories" control 704. In some embodiments, control 704 may present a list of categories based on the user selection of category type through control 702. In the example shown, the user has selected the Demographic category type through control 702, and control 704 has been populated with a list of categories that correspond to the Demographic category type (e.g., categories for Age, Citizenship, Education, Employment, and the like). The user may then select one or more categories from this list to be included in the query. In some embodiments, categories may be presented in a hierarchical structure as a listing of categories, sub-categories, sub-sub-categories, and so forth. Such a hierarchy of categories may be presented to the user in a tree structure or the like. For example, as shown in the figure, the user has expanded the Gender category (e.g. through use of a +/– expand/collapse tree control) to expose two sub-categories of Gender—Male and Female. The user has further selected the Female sub-category for inclusion in the query.

User interface 700 may also include elements that display the user-specified query as the user adds, removes and/or otherwise modifies the query. For example, elements 708 and 710 may depict two exemplary categories that the user has selected to be included in the query, through use the controls 702 and 704. Element 708 shows that the user has selected a first category of "Luxury Cars", specified in its hierarchical form as category type "In-Market" combined with category "Autos>By Class>Luxury Cars". Element 710 shows that the user has further selected a second category of "Female", specified in its hierarchical form as category type "Demographic" combined with category "Gender>Female". In some embodiments, user interface 700 may also present a category size for selected categories. Such category size may be based on an analysis of historical data, for example a determination that the specified category would have reached an audience volume of a certain number during a specified past time period (e.g. the last month). For example, element 708 includes a determined Category Size of 7,000,000 and element 710 includes a determined category size of 50,000,000. User interface 700 may further include a control 712 to allow a user to specify a logical Boolean operator as part of the specified query. For example, FIG. 7 depicts control 712 as set to "AND" by the user, to specify that the query should be a first category AND a second category. Elements 708 and 710 may further include "delete" controls as shown, to enable the user to delete a particular category from the query.

User interface 700 may also include a control 714 to enable the user to add one or more additional categories (e.g. sub-segments) to the query. Addition of further categories to the query may cause the user interface to display the additionally specified categories in additional categories elements such as elements 708 and 710. In the way, the user is able to specify a custom query composed of categories and/or subcategories, combined using logical operators.

Once the user has specified the query, element 706 may display a current reach for the specified query. In some embodiments, this current reach may be a historical audience volume corresponding to the user-specified query, provided as a retrospective analysis to the user. For example, as shown in FIG. 7, element 706 shows a current reach of 1,000,000 audience volume, indicating that a campaign using the user-specified query would have reached an audience volume of 1,000,000 if it had been run during a past time period (e.g. the last month).

Element 706 may further display "Estimated Impressions" based on an audience volume prediction for a future time period. The predicted audience volume may be provided to the user as a number of persons that are predicted to be reached by a campaign that uses the specified query for a determined future time period, and/or a range of an estimated number of persons predicted to be reached. Such a prediction may be based on an analysis of stored historical data, as described herein with regard to FIG. 4. For example, as shown in FIG. 7, element 706 includes "Estimated Monthly Impressions" as a range of 600,000 to 1,200,000, indicating that a campaign using the user-specified query is estimated to reach a predicted audience volume within this range if run during a certain future time period. In some embodiments, the "Current Reach" and "Estimated Impressions" number may be provided and/or updated to the user in real-time as the user specifies and/or modifies the query respectively, such that the user may more or less immediately see the predicted audience volume and/or retrospective audience volume that would be reached by a campaign using the query.

It should be noted that user interface 700 is an example user interface that may be employed in embodiments of the invention. Generally, such a user interface may include more or fewer elements that those depicted, without departing from the spirit or scope of the invention. For example, though not depicted in FIG. 7, user interface 700 may further include controls to allow the user to edit the past time period and/or future time period.

It will be understood that figures, and combinations of steps in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational steps to be performed by the processor to produce a computer implemented process for implementing the actions specified in the flowchart block or blocks. These program instructions may be stored on a machine readable media, such as computer readable media and/or processor readable storage media.

The above specification, examples, and data provide a complete description of the manufacture and use of the

What is claimed as new and desired to be protected by Letters Patent is:

1. A computer implemented method for generating information regarding an advertising audience volume, comprising using a processor to perform actions over a network, the actions comprising:
   processing a request for a real time prediction that forecasts the advertising audience volume over an editable future time period, the request including at least a query, wherein the request identifies the editable future time period and wherein the request corresponds to a specified level of service and quality of service that determines a number of prediction servers for processing the request;
   managing, at a prediction server, a speed of processing the request at least by storing a portion of historical data in memory and another portion of the historical data in one or more persistent storage devices based in part or in whole upon frequencies of accessing the historical data;
   evaluating the query on the historical data over the one or more past time periods, by:
      identifying historical advertising audience volumes that would have been reached had the query been executed during the one or more past time periods;
      retrieving a set of historical data by sampling the historical advertising audience volumes for reducing an amount of the historical data for processing the request, wherein a level of service and a quality of service are balanced against one another by changing at least a sampling rate for sampling the historical advertising audience volumes and a number of employed servers to satisfy the user specified level of service and quality of service; and
      performing smoothing on the set of historical data retrieved from the historical advertising audience volumes based at least in part upon one or more data sources for the set of historical data and temporal differences in the one or more past time periods; and
   generating the real time prediction for the editable future time period based at least on the evaluation of the query over the historical data for the one or more past time periods.

2. The method of claim 1, further comprising at least one of:
   weighting at least a portion of the editable future time period and the one or more past time periods; or
   weighting at least a portion of the query.

3. The method claim 1, further comprising:
   applying at least one edit to the query, the editable future time period, or the one or more past time periods; and
   regenerating the real time prediction of the advertising audience volume based in part or in whole upon the at least one edit to the query, the editable future time period, or the one or more past time periods.

4. The method of claim 1, wherein generating the real time prediction for the editable future time period further includes:
   determining a plurality of weights for the historical advertising audience volumes based at least on recency of data in the historical advertising audience volumes; and
   determining the real time prediction for the editable future time period based on applying the plurality of weights to the historical advertising audience volumes.

5. The method of claim 1, wherein generating the real time prediction for the editable future time period further includes:
   determining a plurality of weights for the historical advertising audience volumes based at least on recency of data in the historical advertising audience volumes; and
   determining the real time prediction for the editable future time period based on applying the plurality of weights to the historical advertising audience volumes in at least one of a mathematical calculation and a logic determination.

6. The method of claim 1, further comprising:
   applying at least one edit to the query, wherein the at least one edit to the query includes a tuning of at least one category of data included in the query.

7. The method of claim 1, further comprising:
   applying at least one edit to the query, wherein the at least one edit to the query includes a tuning of at least one category of data included in the query, wherein the at least one category is associated with a category type that is at least one of in-market type, demographic type, location type and season type.

8. The method of claim 1, wherein the real time prediction of the advertising audience volume includes at least a number of persons in the predicted advertising audience volume or a range of the number of persons in the predicted advertising audience volume.

9. The method of claim 1, wherein changing at least the sampling rate for sampling the historical advertising audience volumes to satisfy the specified level of service and quality of service further comprises determining a subset of the historical data to be sampled based at least on meeting the specified level of service or the quality of service.

10. The method of claim 1, further comprising determining a confidence metric for the real time prediction.

11. The method of claim 1, wherein generating the real time prediction for the editable future time period further includes:
    determining at least one subset of the historical advertising audience volumes; and
    evaluating the query over the determined at least one subset of the historical advertising audience volumes for the one or more past time periods.

12. One or more processor readable non-transitory computer-readable storage media that includes instructions, which when executed by at least one processor, cause the at least one processor to perform a set of acts, the set of acts comprising:
    processing a request for a real time prediction that forecasts the advertising audience volume over an editable future time period, the request including at least a query, wherein the request identifies the editable future time period and wherein the request corresponds to a specified level of service and quality of service that determines a number of prediction servers for processing the request;
    managing, at a prediction server, a speed of processing the request at least by storing a portion of historical data in memory and another portion of the historical data in one or more persistent storage devices based in part or in whole upon frequencies of accessing the historical data;

evaluating the query on the historical data over the one or more past time periods, by:
identifying historical advertising audience volumes that would have been reached had the query been executed during the one or more past time periods;
retrieving a set of historical data by sampling the historical advertising audience volumes for reducing an amount of the historical data for processing the request, wherein a level of service and a quality of service are balanced against one another by changing at least a sampling rate for sampling the historical advertising audience volumes and a number of employed servers to satisfy the specified level of service and quality of service; and
performing smoothing on the set of historical data retrieved from the historical advertising audience volumes based at least in part upon one or more data sources for the set of historical data and temporal differences in the one or more past time periods; and
generating the real time prediction for the editable future time period based at least on the evaluation of the query over the historical data for the one or more past time periods.

13. The media of claim 12, the set of acts further comprising enabling at least a portion of the editable future time period and the one or more past time periods to be weighted.

14. The media of claim 12, the set of acts further comprising enabling at least a portion of the query to be weighted.

15. The media of claim 12, wherein generating the real time prediction for the editable future time period further includes:
determining a plurality of weights for the historical advertising audience volumes based at least on recency of data in the historical advertising audience volumes; and
determining the real time prediction for the editable future time period based on applying the plurality of weights to the historical advertising audience volumes.

16. The media of claim 12, wherein generating the real time prediction for the editable future time period further includes:
determining a plurality of weights for the historical advertising audience volumes based at least on recency of data in the historical advertising audience volumes; and
determining the real time prediction for the editable future time period based on applying the plurality of weights to the historical advertising audience volumes in at least one of a mathematical calculation and a logic determination.

17. The media of claim 12, the set of acts further comprising:
applying at least one edit to the query, wherein the at least one edit to the query includes a tuning of at least one category of data included in the query.

18. The media of claim 12, the set of acts further comprising:
applying at least one edit to the query, wherein the at least one edit to the query includes a tuning of at least one category of data included in the query, wherein the at least one category is associated with a category type that is at least one of in-market type, demographic type, location type and season type.

19. The media of claim 12, wherein the real time prediction of the advertising audience volume includes at least a number of persons in the predicted advertising audience volume or a range of the number of persons in the predicted advertising audience volume.

20. The media of claim 12, wherein changing at least the sampling rate for sampling the historical advertising audience volumes to satisfy the specified level of service and quality of service further comprises determining a subset of the historical data to be sampled based at least on meeting the specified level of service or the quality of service.

21. The media of claim 12, further comprising determining a confidence metric for the real time prediction.

22. The media of claim 12, wherein generating the real time prediction for the editable future time period further includes:
determining at least one subset of the historical advertising audience volumes; and
evaluating the query over the determined at least one subset of the historical advertising audience volumes for the one or more past time periods.

23. A system for generating information regarding an advertising audience volume over a network, comprising:
a server device that performs actions, the actions including:
processing a request for a real time prediction that forecasts the advertising audience volume over an editable future time period, the request including at least a query, wherein the request identifies the editable future time period and wherein the request corresponds to a specified level of service and quality of service that determines a number of prediction servers for processing the request;
managing, at a prediction server, a speed of processing the request at least by storing a portion of historical data in memory and another portion of the historical data in one or more persistent storage devices based in part or in whole upon frequencies of accessing the historical data;
evaluating the query on the historical data over the one or more past time periods, by:
identifying historical advertising audience volumes that would have been reached had the query been executed during the one or more past time periods;
retrieving a set of historical data by sampling the historical advertising audience volumes for reducing an amount of the historical data for processing the request, wherein a level of service and a quality of service are balanced against one another by changing at least a sampling rate for sampling the historical advertising audience volumes and a number of employed servers to satisfy the specified level of service and quality of service; and
performing smoothing on the set of historical data retrieved from the historical advertising audience volumes based at least in part upon one or more data sources for the set of historical data and temporal differences in the one or more past time periods; and
generating the real time prediction for the editable future time period based at least on the evaluation of the query over the historical data for the one or more past time periods.

24. The system of claim 23, the server device further performing actions including:
enabling at least a portion of the editable future time period and the one or more past time periods to be weighted.

25. The system of claim 23, the server device further performing actions including:
enabling at least a portion of the query to be weighted.

26. The system of claim 23, wherein generating the real time prediction for the editable future time period further includes:
  determining a plurality of weights for the historical advertising audience volumes based at least on recency of data in the historical advertising audience volumes; and
  determining the real time prediction for the editable future time period based on applying the plurality of weights to the historical advertising audience volumes.

27. The system of claim 23, wherein generating the real time prediction for the editable future time period further includes:
  determining a plurality of weights for the historical advertising audience volumes based at least on recency of data in the historical advertising audience volumes; and
  determining the real time prediction for the editable future time period based on applying the plurality of weights to the historical advertising audience volumes in at least one of a mathematical calculation and a logic determination.

28. The system of claim 23, the server device further performing actions including:
  applying at least one edit to the query, wherein the at least one edit to the query includes a tuning of at least one category of data included in the query.

29. The system of claim 23, the server device further performing actions including:
  applying at least one edit to the query, wherein the at least one edit to the query includes a tuning of at least one category of data included in the query, wherein the at least one category is associated with a category type that is at least one of in-market type, demographic type, location type and season type.

30. The system of claim 23, wherein the real time prediction of the advertising audience volume includes at least one of a number of persons in the predicted advertising audience volume or a range of the number of persons in the predicted advertising audience volume.

31. The system of claim 23, wherein changing at least the sampling rate for sampling the historical advertising audience volumes to satisfy the specified level of service and quality of service further comprises determining a subset of the historical data to be sampled based at least on meeting the specified level of service or the quality of service.

32. The system of claim 23, further comprising determining a confidence metric for the real time prediction.

33. The system of claim 23, wherein generating the real time prediction for the editable future time period further includes:
  determining at least one subset of the historical advertising audience volumes; and
  evaluating the query over the determined at least one subset of the historical advertising audience volumes for the one or more past time periods.

34. An apparatus for generating information regarding an advertising audience volume over a network, comprising:
  a memory device for storing data and instructions; and
  processor device that is configured to execute instructions stored in the memory device, wherein executions of the instructions by the processor device cause the processor device to:
    process a request for a real time prediction that forecasts the advertising audience volume over an editable future time period, the request including at least a query, wherein the request identifies the editable future time period and wherein the request corresponds to a specified level of service and quality of service that determines a number of prediction servers for processing the request;
    manage, at a prediction server, a speed of processing the request at least by storing a portion of historical data in memory and another portion of the historical data in one or more persistent storage devices based in part or in whole upon frequencies of accessing the historical data;
    evaluate the query on the historical data over the one or more past time periods, by:
      identifying historical advertising audience volumes that would have been reached had the query been executed during the one or more past time periods;
      retrieving a set of historical data by sampling the historical advertising audience volumes for reducing an amount of the historical data for processing the request, wherein a level of service and a quality of service are balanced against one another by changing at least a sampling rate for sampling the historical advertising audience volumes and a number of employed servers to satisfy the specified level of service and quality of service; and
      perform smoothing on the set of historical data retrieved from the historical advertising audience volumes based at least in part upon one or more data sources for the set of historical data and temporal differences in the one or more past time periods; and
    generate the real time prediction for the editable future time period based at least on the evaluation of the query over the historical data for the one or more past time periods.

35. The apparatus of claim 34, wherein executions of the instructions by the processor device further cause the processor device to:
  enable at least a portion of the editable future time period and the one or more past time periods to be weighted.

36. The apparatus of claim 34, wherein executions of the instructions by the processor device further cause the processor device to:
  enable at least a portion of the query to be weighted.

37. The apparatus of claim 34, wherein generating the real time prediction for the editable future time period further includes:
  determining a plurality of weights for the historical advertising audience volumes based at least on recency of data in the historical advertising audience volumes; and
  determining the real time prediction for the editable future time period based on applying the plurality of weights to the historical advertising audience volumes.

38. The apparatus of claim 34, wherein generating the real time prediction for the editable future time period further includes:
  determining a plurality of weights for the historical advertising audience volumes based at least on recency of data in the historical advertising audience volumes; and
  determining the real time prediction for the editable future time period based on applying the plurality of weights to the historical advertising audience volumes in at least one of a mathematical calculation and a logic determination.

39. The apparatus of claim 34, wherein executions of the instructions by the processor device further cause the processor device to:
  apply at least one edit to the query, wherein the at least one edit to the query includes a tuning of at least one category of data included in the query.

40. The apparatus of claim 34, wherein executions of the instructions by the processor device further cause the processor device to:
   apply at least one edit to the query, wherein the at least one edit to the query includes a tuning of at least one category of data included in the query, wherein the at least one category is associated with a category type that is at least one of in-market type, demographic type, location type and season type.

41. The apparatus of claim 34, wherein the real time prediction of the advertising audience volume includes at least one of a number of persons in the predicted advertising audience volume or a range of the number of persons in the predicted advertising audience volume.

42. The apparatus of claim 34, wherein changing at least the sampling rate for sampling the historical advertising audience volumes to satisfy the specified level of service and quality of service further comprises determining a subset of the historical data to be sampled based at least on meeting the specified level of service or the quality of service.

43. The apparatus of claim 34, wherein executions of the instructions by the processor device further cause the processor device to:
   determine a confidence metric for the real time prediction.

44. The apparatus of claim 34, wherein generating the real time prediction for the editable future time period further includes:
   determining at least one subset of the historical advertising audience volumes; and
   evaluating the query over the determined at least one subset of the historical advertising audience volumes for the one or more past time periods.

* * * * *